(12) United States Patent
Kim et al.

(10) Patent No.: US 7,801,088 B2
(45) Date of Patent: Sep. 21, 2010

(54) SYNCHRONOUS ORTHOGONAL FREQUENCY DIVISION MULTIPLEXING RECEIVING APPARATUS IN MULTI-CELL ENVIRONMENT AND METHOD THEREOF

(75) Inventors: Jun-Woo Kim, Daejeon (KR); Jae-Gun Jung, Daejeon (KR); Youn-Ok Park, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 616 days.

(21) Appl. No.: 11/720,605

(22) PCT Filed: Nov. 10, 2005

(86) PCT No.: PCT/KR2005/003805

§ 371 (c)(1),
(2), (4) Date: May 31, 2007

(87) PCT Pub. No.: WO2006/059844

PCT Pub. Date: Jun. 8, 2006

(65) Prior Publication Data

US 2008/0123517 A1     May 29, 2008

(30) Foreign Application Priority Data

Dec. 3, 2004    (KR) ...................... 10-2004-0101082

(51) Int. Cl.
*H04B 7/216* (2006.01)
*H04L 7/00* (2006.01)

(52) U.S. Cl. ...................................... 370/335; 375/354
(58) Field of Classification Search ...................... None
See application file for complete search history.

(56) References Cited

U.S. PATENT DOCUMENTS 6,711,120 B1     3/2004    Laroia et al.

(Continued)

FOREIGN PATENT DOCUMENTS

EP     1 313 336 A2    5/2003

(Continued)

OTHER PUBLICATIONS

"A novel broadband wireless OFDMA scheme for downlink in cellualr communications" Junqiang Li. et al., 2003.

*Primary Examiner*—Ricky Ngo
*Assistant Examiner*—Clemence Han
(74) *Attorney, Agent, or Firm*—Jefferson IP Law, LLP (57) ABSTRACT

A receiving apparatus of a mobile terminal receiving a signal in a synchronous OFDM system under a multi-cell environment, including a demodulation start controller performing frame synchronization and cell search using a received signal and outputting information on a demodulation start point and a to-be-demodulated neighbor cell; a FFT unit converting a time-domain signal into a frequency-domain signal; a scramble code generator generating scramble codes for the to-be-demodulated neighbor cell from the demodulation start controller and the current cell; a correlator multiplying a signal from the FFT unit and scramble codes from the scramble code generator and outputting correlation signals; demodulators provided corresponding to a current cell and a maximum number of neighbor cells to be demodulated, and demodulating the correlation signals; and a decoder decoding signals from the demodulators and restoring original information transmitted from the corresponding cell.

17 Claims, 6 Drawing Sheets

U.S. PATENT DOCUMENTS

| | | | |
|---|---|---|---|
| 7,110,438 B2 * | 9/2006 | Ho et al. | 375/147 |
| 2003/0040311 A1 | 2/2003 | Choi | |
| 2004/0022273 A1 * | 2/2004 | Jo et al. | 370/503 |
| 2004/0196893 A1 * | 10/2004 | Oh et al. | 375/148 |
| 2004/0246998 A1 * | 12/2004 | Ma et al. | 370/527 |
| 2005/0025087 A1 * | 2/2005 | Tamura | 370/320 |
| 2005/0163238 A1 * | 7/2005 | Fujii | 375/260 |
| 2005/0180311 A1 * | 8/2005 | Wang et al. | 370/208 |
| 2006/0062196 A1 * | 3/2006 | Cai et al. | 370/345 |
| 2006/0114812 A1 * | 6/2006 | Kim et al. | 370/206 |
| 2007/0041348 A1 * | 2/2007 | Kwun et al. | 370/335 |
| 2008/0043858 A1 * | 2/2008 | Lim et al. | 375/260 |

FOREIGN PATENT DOCUMENTS

| | | |
|---|---|---|
| JP | 2003-199137 A | 7/2003 |
| JP | 2004-207983 A | 7/2004 |
| KR | 1020040045996 A | 6/2004 |
| WO | WO 03/058838 A1 | 7/2003 |

* cited by examiner

SYNCHRONOUS ORTHOGONAL FREQUENCY DIVISION MULTIPLEXING RECEIVING APPARATUS IN MULTI-CELL ENVIRONMENT AND METHOD THEREOF

TECHNICAL FIELD

The present invention relates to a receiving apparatus of a mobile terminal in an Orthogonal Frequency Division Multiplexing (OFDM) system, and more particularly relates to a receiving apparatus that demodulates signals from a cell in which a mobile terminal is located and a neighbor cell in a multi-cell environment and a method thereof.

BACKGROUND ART

OFDM is a transmission technique that divides data into a number of orthogonal carriers, and the data is transmitted in parallel overlapping the carriers to thereby minimize space between the carriers. The OFDM system is efficient in complementing radio channel impairments, such as multi-path fading, interchannel interference, and noise, etc. Recently, OFDM is being applied for fixed and mobile digital transmission including high resolution television broadcasting.

In an OFDM-based multi-cell environment, a terminal receives a signal transmitted from base stations respectively covering different cells. In particular, all the base stations synchronize signal transmission using a global positioning system (GPS) such that the terminal almost synchronously receives signals from a base station of a cell in which the mobile terminal is located ("hereinafter referred to as a "current cell") and a base station of a neighbor cell.

Since a mobile terminal of a synchronous OFDM system receives signals transmitted from several different cells in the multiple-cell environment, the mobile terminal obtains much information by demodulating signals transmitted from the base station of a current cell and neighboring cells.

Korean Patent Publication No. 10-2004-0045996 (entitled "Method and apparatus for embodying and synchronizing downlink signal in mobile communication system and method for searching cell using the same"), filed and published from the same laboratory, discloses a method for searching information on an associated base station and a neighbor cell. However, this prior art describes a method for searching information on a base station of a current cell and a neighbor cell in a multi-cell environment rather that describing a method for demodulating signals transmitted from the base station and the neighbor cell.

In addition, conventionally, a structure of a mobile terminal is complicated because multiple FFT operations are performed to receive signals from a current cell and its neighbor cells, and precise control of synchronization and the FFT operations is also required in consideration of the multi-cell environment. The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

DISCLOSURE OF INVENTION

Technical Problem

The present invention has been made in an effort to provide a synchronous Orthogonal Frequency Division Multiplexing (OFDM) system and a method thereof having advantages of demodulating signals transmitted from a current cell and its neighbor cell using one Fast Fourier Transform (FFT) unit and performing precise control of synchronization and FFT operation in a multi-cell environment.

Technical Solution

In one aspect of the present invention, there is provided a receiving apparatus of a mobile terminal receiving a transmitted signal in a synchronous Orthogonal Frequency Division Multiplexing (OFDM) system under a multi-cell environment. The receiving apparatus includes a demodulation start controller performing frame synchronization and cell search using a received signal and outputting information on a demodulation start point and a to-be-demodulated neighbor cell; a Fast Fourier Transform (FFT) unit converting a time-domain signal transmitted from multiple cells into a frequency-domain signal; a scramble code generator generating scramble codes respectively corresponding to the to-be-demodulated neighbor cell output from the demodulation start controller and a current cell; a correlator multiplying a signal output from the FFT unit and scramble codes output from the scramble code generator and outputting the corresponding correlation signal; a plurality of demodulators provided corresponding to a current cell and a maximum number of to-be-demodulated neighbor cells, and demodulating the correlation signal output from the correlator and outputting a demodulating result; and a decoder decoding signals output from the plurality of demodulators and restoring original information transmitted from the corresponding cell.

The demodulation start point is set to the last signal of signals transmitted from the to-be-demodulated neighbor cell.

Start points of signals transmitted from the current cell and the to-be-demodulated neighbor cell are set to be within a cyclic prefix.

The to-be-demodulated neighbor cell is determined when the mobile terminal is located on an edge of the current cell and the to-be-demodulated neighbor cell.

In another aspect of the present invention, there is provided a method for receiving a transmitted signal in a synchronized Orthogonal Frequency Division Multiplexing (OFDM) system under a multi-cell environment. The method includes a) obtaining frame synchronization of signals transmitted from multiple cells, and determining whether start points of each frame synchronized signal are respectively included within a predetermined range; b) performing cell search in the frame synchronized signals when the start points of the frame synchronized signals are included within the predetermined range; c) after performing the cell search, determining whether to demodulate a neighbor cell of a current cell; and d) setting a demodulation start point at the last signal transmitted from the to-be-demodulated neighbor cell and performing demodulation on the current cell and the to-be-demodulated neighbor cell when the neighbor cell is determined to be demodulated in c).

Advantageous Effects

According to the present invention, signals transmitted from neighbor cells of a current cell may be demodulated without adding an FFT unit in the synchronous OFDM system under the multi-cell environment.

In addition, the synchronous OFDM system provides accurate synchronization so the signals transmitted from the neighbor cells may be accurately demodulated when the mobile terminal is located on the cell edge.

BEST MODE FOR CARRYING OUT THE INVENTION

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. A synchronous OFDM-based receiving apparatus in a multi-cell environment according to an exemplary embodiment of the present invention will hereinafter be described with reference to the accompanying drawings.

Figure 1:
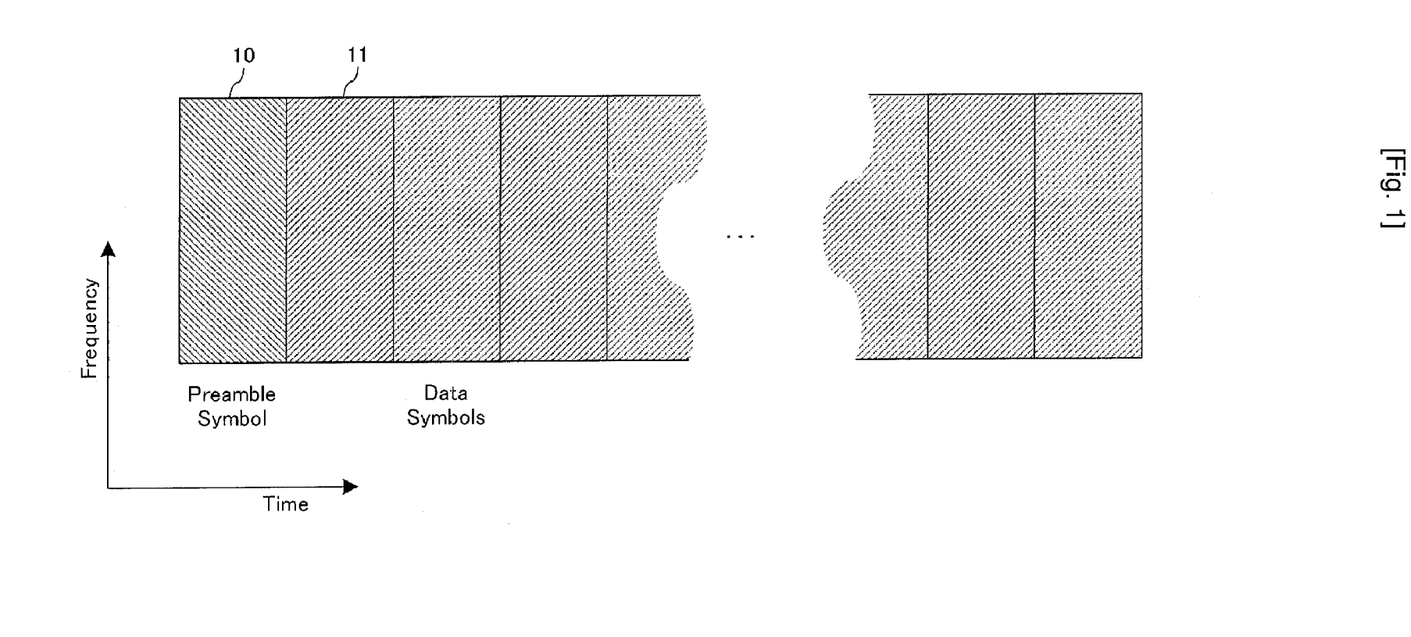
FIG. 1 shows a structure of a downlink frame of Orthogonal Frequency Division Multiplexing (OFDM) signal transmission in a multi-cell environment.

FIG. 1 shows a structure of a downlink frame of an OFDM signal transmitted in a multi-cell environment.

As shown in FIG. 1, the downlink frame of the OFDM signal in a multi-cell environment begins with one or two preamble symbols 10 and data symbols 11 following the preamble symbol 10.

Each preamble symbol is coded different for each sector, and thus, a mobile terminal performs a cell search process using the preamble symbol. As a result of the cell search, the mobile terminal obtains information on a cell and a sector in which the mobile terminal is currently located.

Since data symbols, excluding the preamble signal, are respectively multiplied with different scramble codes for each cell and sector in a frequency-domain, the mobile terminal demodulates the corresponding data symbol using a scramble code of a desired base station. In other words, the mobile terminal performs Fast Fourier Transform (FFT) on the received data symbols and multiplies the scramble code of the base station in which the mobile terminal is currently located and a result of the FFT so that the data symbols are demodulated to original data. Herein, a scramble code denotes a unique pseudo noise code of each base station.

Figure 2:
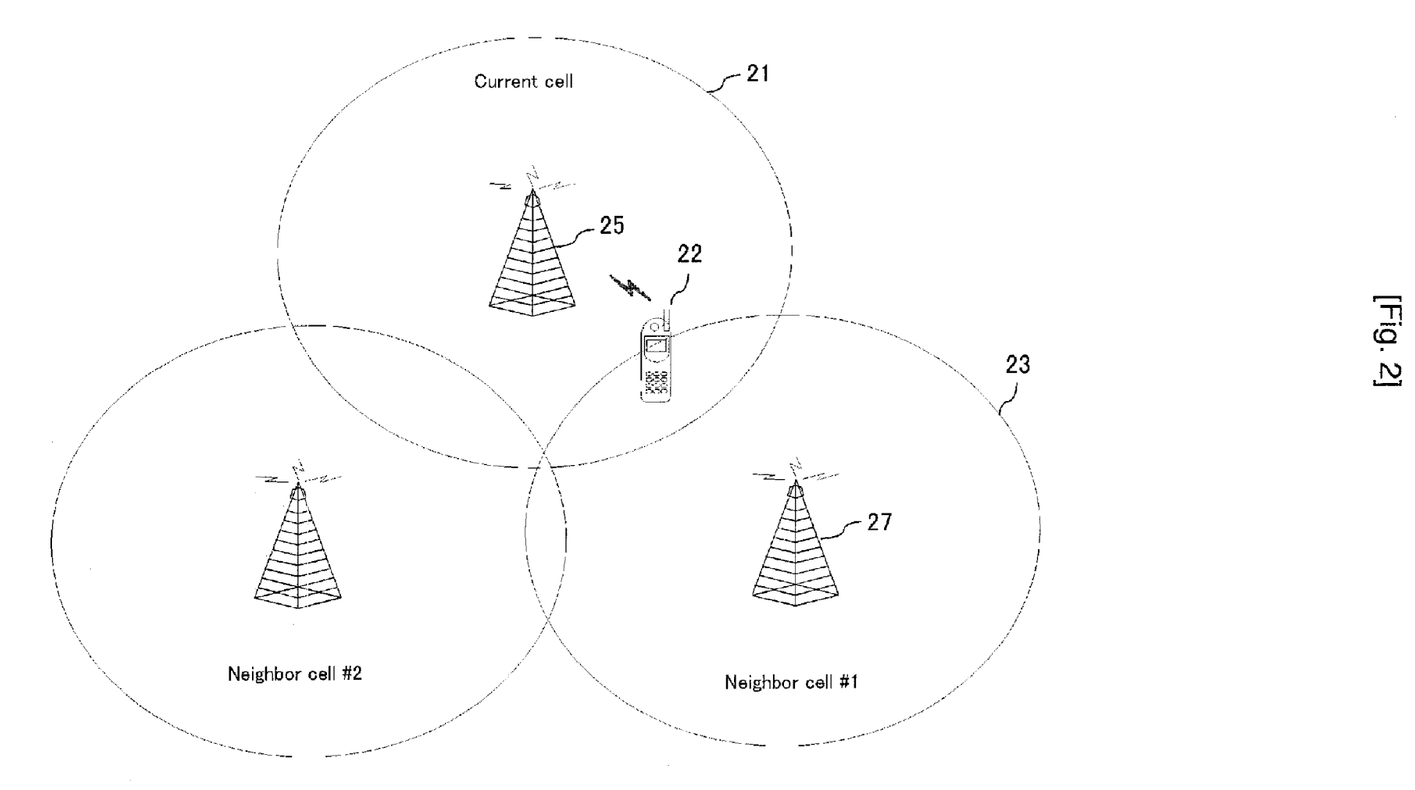
FIG. 2 illustrates a multi-cell environment in a synchronous OFDM system.

FIG. 2 illustrates a multi-cell environment of a synchronous OFDM system.

As shown in FIG. 2, a mobile terminal 22 receives signals transmitted from base stations 25 and 27 respectively serving cells 21 and 23. At this point, the respective base stations 25 and 27 transmit signals using different scramble codes. Since all the base stations are synchronized using a global positioning system (GPS) in the synchronous OFDM system, the mobile terminal 22 almost synchronously receives a signal transmitted from the cell 21 in which the mobile terminal 22 is located and a neighbor cell 23 when the mobile terminal 22 is located on an edge of the two cells 21 and 23, as shown in FIG. 2. The mobile terminal 22 may demodulate the signal transmitted from the cell 21 in which the mobile terminal is currently located only when using the scramble code of the cell 21.

Figure 3:
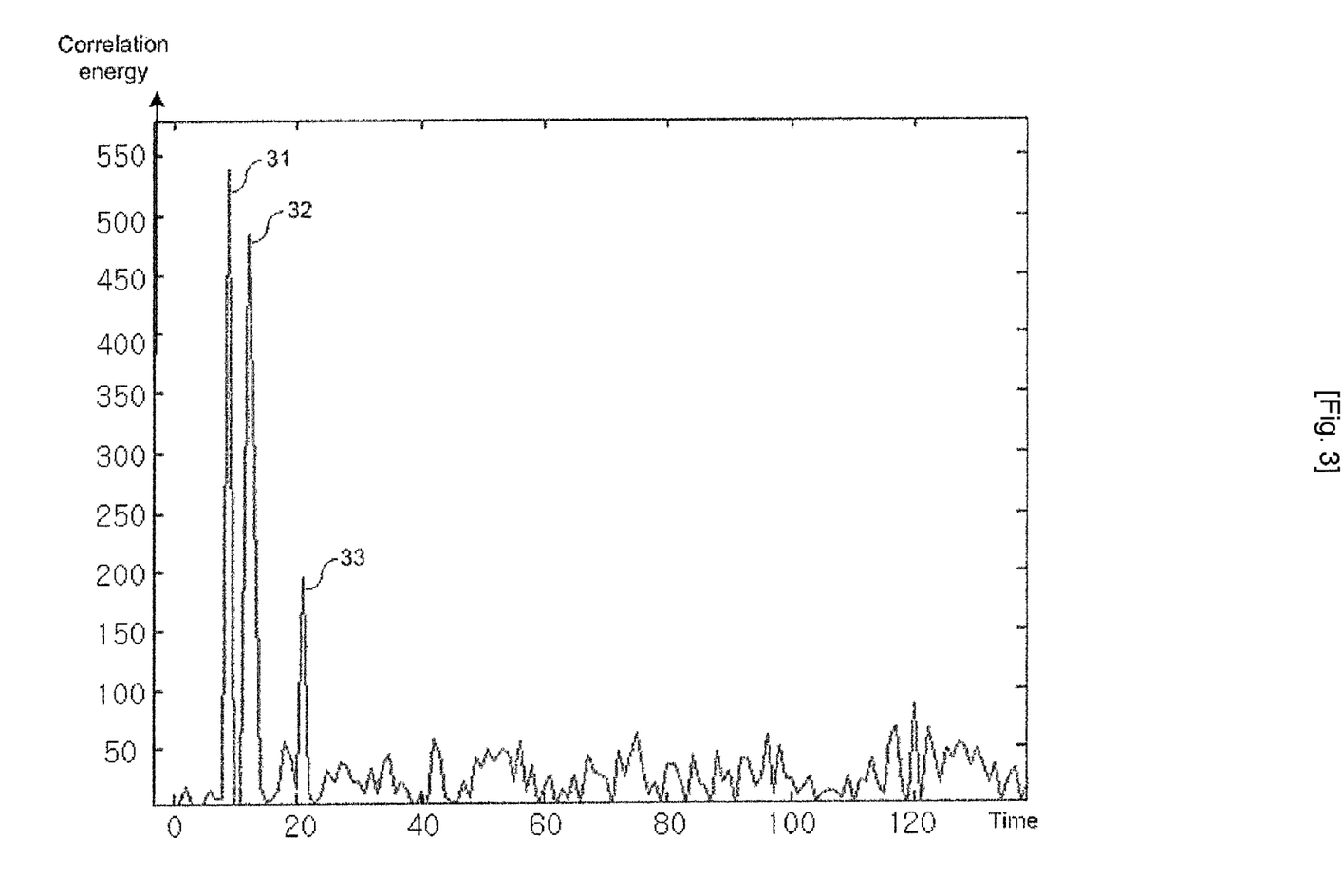
FIG. 3 is a waveform diagram showing a result of frame synchronization when a mobile terminal of the synchronous OFDM system is located on an edge of the cells in a multi-cell environment.

FIG. 3 is a waveform diagram showing a result of frame synchronization when a mobile terminal of the synchronous OFDM system is located on a cell edge in the multi-cell environment.

In the waveform of FIG. 3, a signal 31 from the cell 21 in which the mobile terminal is located is transmitted the fastest and with the highest signal strength to the mobile terminal 22, and then signals 32 and 33 from the neighbor cell 23 are transmitted to the mobile terminal 22. The signal strengths of the signals 32 and 33 are weaker than that of the signal 31. However, it seems that transmission speed and signal strength between the signal 31 and the signals 32 and 33 are not much different with each other in the waveform of FIG. 3.

As described, in a multi-cell environment, the mobile terminal of the synchronous OFDM system receives signals transmitted from several cells, and hence, the mobile terminal may obtain much information by demodulating the signals transmitted from the current cell and the neighbor cells. However, this should be performed in consideration of the multi-cell environment, and requires a precise control of synchronization and FFT operation.

Figure 4:
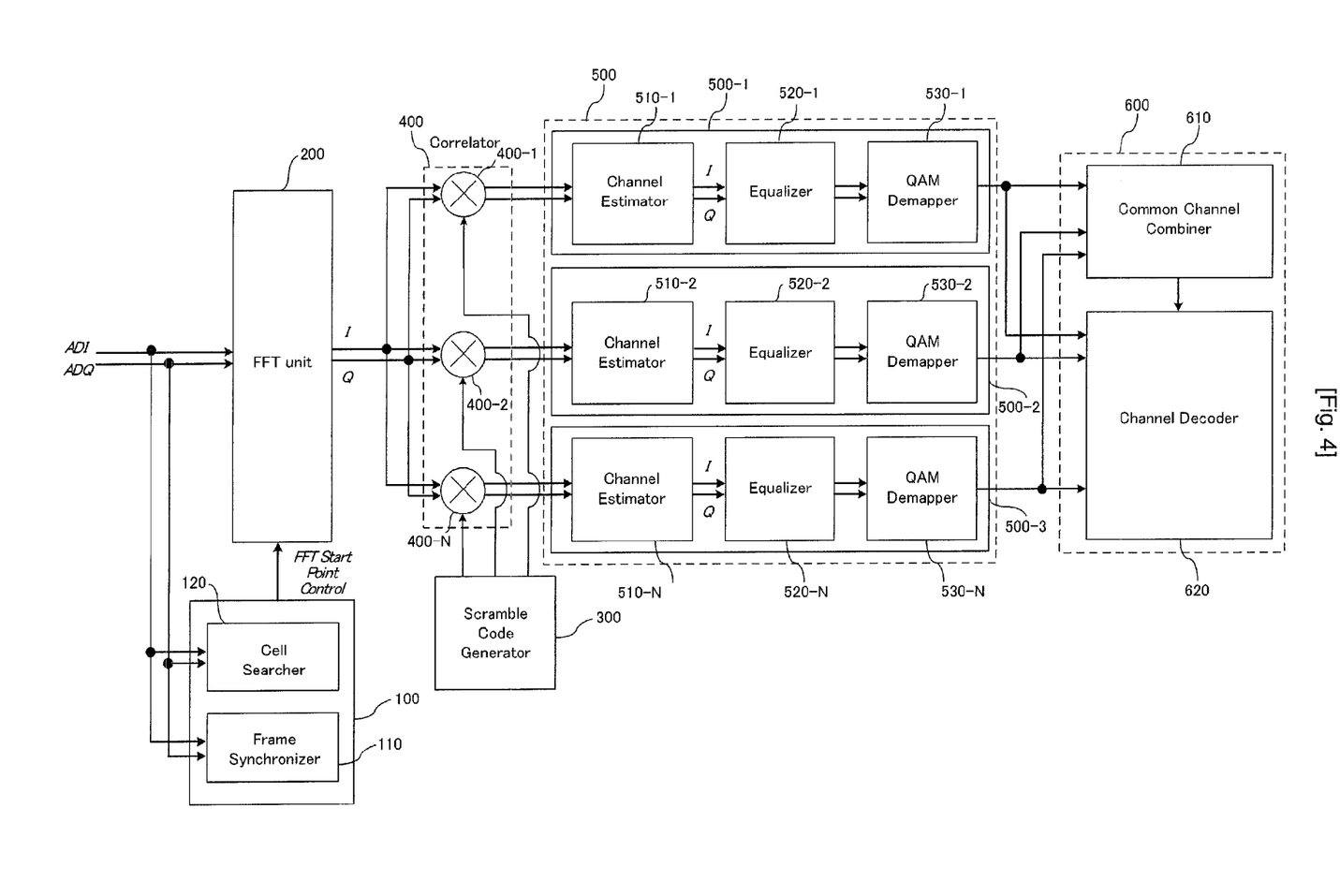
FIG. 4 is a block diagram of a synchronous OFDM reception device in a multi-cell environment according to an embodiment of the present invention.

FIG. 4 is a block diagram of a synchronous OFDM-based receiving apparatus in a multi-cell environment according to an embodiment of the present invention.

As shown in FIG. 4, the synchronous OFDM-based receiving apparatus includes a demodulation start point controller 100, a FFT unit 200, a scramble code generator 300, a correlator 400, a demodulator 500, and a decoder 600.

The demodulation start point controller 100 performs frame synchronization and cell search using a received signal and outputs a FFT start point control signal that controls a demodulation process to be started.

The demodulation start point controller 100 includes a frame synchronizer 110 and a cell searcher 120.

Figure 5:
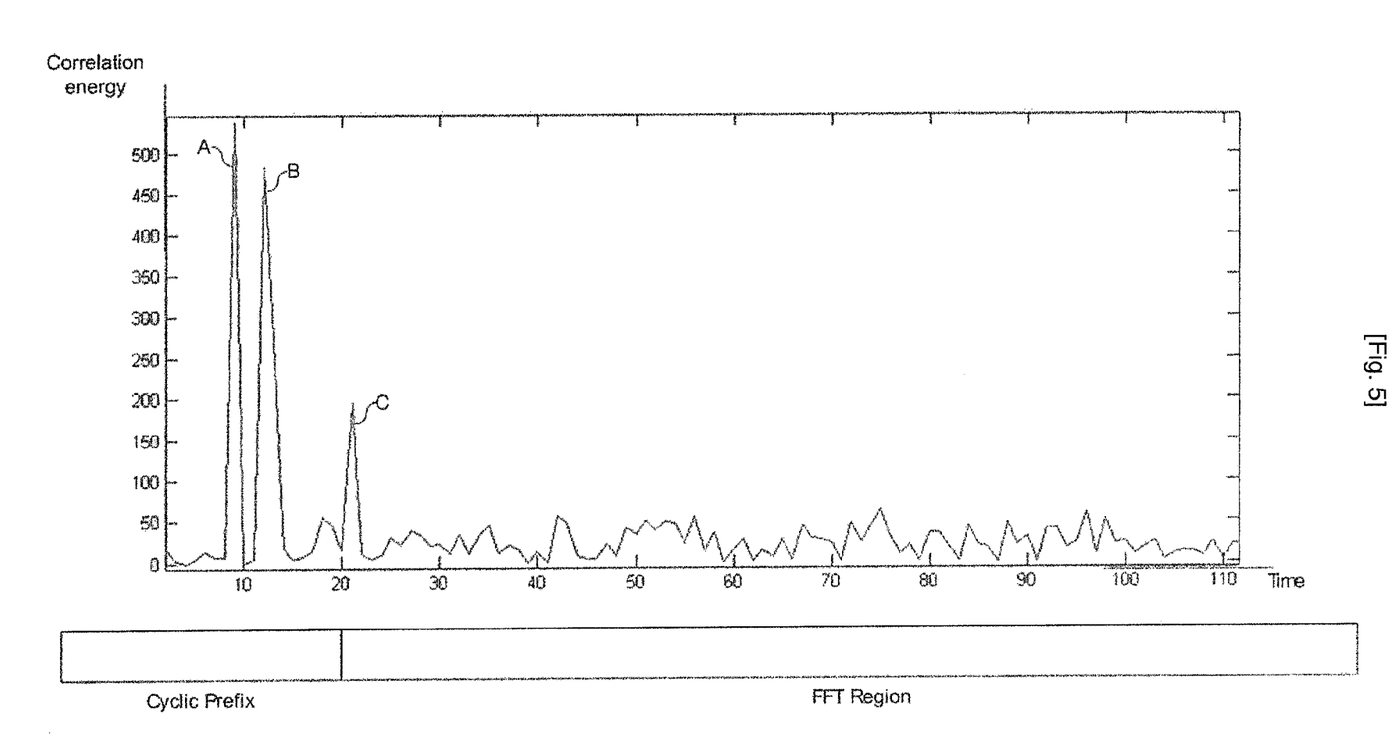
FIG. 5 shows a relation between a start point of signals to be demodulated, a start point of FFT, and a cyclic prefix in the synchronous OFDM reception device of FIG. 4.

The frame synchronizer 110 searches start points of signals transmitted from a current cell and a neighbor cell and notifies the start points to the cell searcher 120. At this point, the start points of the signals transmitted from the cell and the neighbor cell are controlled to be within a cyclic prefix, as shown in FIG. 5, so as to start cell search and demodulation. The start point of the signals from the cell and the neighbor cell are within the cyclic prefix when the mobile terminal is located on the cell edge in the synchronous OFDM system under the multi-cell environment according to the embodiment of the present.

The cell searcher 120 searches cells using the received signal and obtains information on a current cell and a neighbor cell, and outputs a FFT start point control signal to control the demodulation for the signals transmitted from the current cell and the neighbor cell to be performed when the information on the cell and the neighbor cell correspond to information on the cell and the neighbor cell transmitted in advance through a medium access control (MAC) message. At this point, the cell searcher 120 allows the demodulation of the signal from the neighbor cell to be performed only when the mobile terminal is located on an edge of the cell and the neighbor cell. When the mobile terminal is located on the cell edge, the strength of the signal transmitted from the neighbor cell exceeds a predetermined threshold value. The information on the neighbor cell, obtained by the cell searcher 120 and to be demodulated, is transmitted to the scramble code generator 300.

The FFT unit 200 converts a time-domain signal transmitted from each cell to a frequency-domain signal, and outputs the frequency-domain signal. A signal FFT unit 200 is used for performing the FFT operation on signals transmitted from the current cell and the neighbor cell and outputting a FFT converted signal according to an embodiment of the present invention. As described, the demodulation is started when the start points of all the signals to be demodulated are within the cyclic prefix, and hence, a FFT start point of the FIT unit 200 is set to be from the last signal C of the signals to be demodulated. When a signal A, transmitted the fastest from a current cell, is set to be the FIT start point in consideration of the signal strength, the signals transmitted from the neighbor cells may not be demodulated because the signals transmitted after the signal A is transmitted become no longer included within the cyclic prefix.

The scramble code generator 300 generates a unique scramble code for each cell to identify a signal transmitted from each cell. The scramble code generator 300 generates a scramble code for a signal transmitted from a current cell and a scramble code for a signal to be demodulated transmitted from a neighbor cell according to an embodiment of the present invention. At this point, the scramble code used for the signal from the neighbor cell may be identified through a preamble signal transmitted to the cell searcher 120 from the neighbor cell and through a MAC message transmitted from a base station of the current cell. The scramble code generator 300 identifies a scramble code through a preamble signal or a MAC message, and generates and provides scramble codes for the cell and the neighbor cell when the demodulation is started. Herein, it is possible to control the scramble code generator 300 to generate a scramble code for a neighbor cell searched by the cell searcher 120 and to be demodulated.

The correlator 400 includes a plurality of multipliers 400-1 to 400-N. Herein, N corresponds to the number of demodulation paths provided for the current cell and neighbor cells. The respective multipliers 400-1 to 400-N receive frequency-domain signals output from the FFT unit 200, generate correlation signals by multiplying the frequency-domain signals output from the FFT unit 200 and scramble codes output from the scramble code generator 300, respectively, and output the correlation signals. Herein, the scramble codes output from the scramble code generator 300 correspond to the respective demodulation paths. For example, the multiplier 400-1 generates a correlation signal for a current cell and outputs the correlation signal, and the multipliers 400-2 to 400-N generate correlation signals for neighbor cells and output the correlation signals.

The demodulator 500 demodulates each correlation signal output from the correlator 400 and outputs a demodulating result. At this point, the demodulator 500 includes demodulation paths 500-1 to 500-N that correspond to the number of correlation signals to be demodulated.

The respective demodulation paths 500-1 to 500-N include channel estimators 510-1 to 510-N, equalizers 520-1 to 520-N, and Quadrature Amplitude Modulation (QAM) demappers 530-1 to 530-N.

The channel estimators 510-1 to 510-N perform a channel search process using the correlation signals output from the correlator 400, the equalizers 520-1 to 520-N correct distortion of a channel searched signal due to noise, amplitude attenuation, and phase shift during transmission, and the QAM demappers 530-1 to 530-N demap QAM mapped signals output from the equalizers 520-1 to 520-N and output the demapped signals.

As described, one demodulation path through which one correlation signal output from the correlator 400 is demodulated is formed by one channel estimator, one equalizer, and one QAM demapper.

The decoder 600 decodes signals which are demodulated through the respective demodulation paths and output from the demodulator 500 so that the signals are decoded into original information transmitted from the corresponding cell.

The decoder 600 includes a common channel combiner 610 and a channel decoder 620.

The common channel combiner 610 receives signals corresponding to common channels (e.g., broadcast channel) transmitted from the base stations of the current cell and the neighbor cell from among signals demodulated by the demodulator 500 through the respective demodulating paths, and combines the received signals to be a single type of information.

The channel decoder 620 restores the signals demodulated by the demodulator 500 through the respective demodulation paths and the information output from the common channel combiner 610 to original signals and outputs the original signals.

Figure 6:
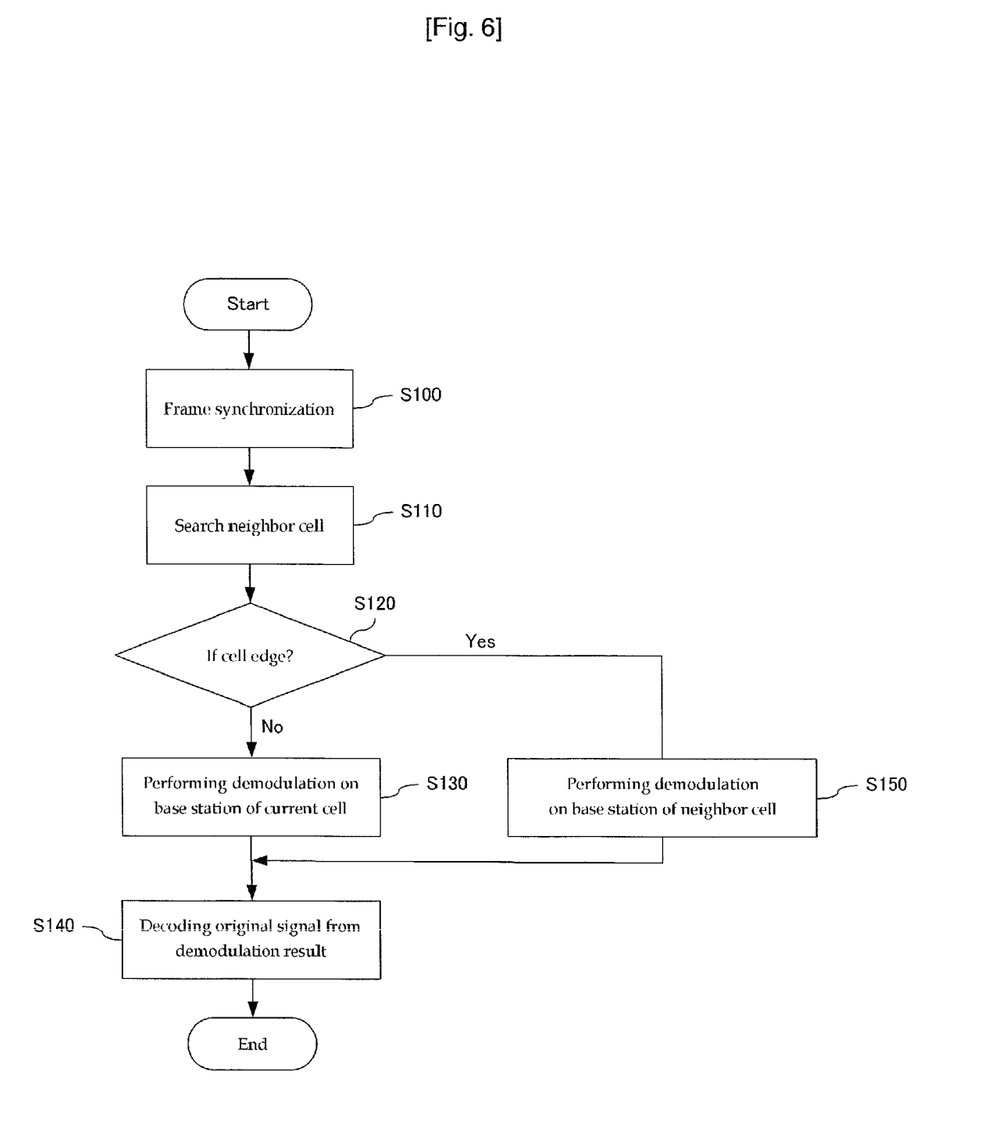
FIG. 6 is a flowchart of a method for receiving a synchronous OFDM in a multi-cell environment according to an embodiment of the present invention.

A synchronous OFDM demodulation method in a multi-cell environment will now be described in more detail with reference to FIG. 6.

A mobile terminal is set to demodulate signals transmitted from a current cell and neighbor cells in consideration of a number of neighbor cells. In other words, the number of correlators 400 and the number of demodulators 500 need to be predefined. The mobile terminal is aware of information on the neighbor cells in advance, in particular, scramble codes for the neighbor cells, through a MAC message transmitted from a base station of the current cell.

The frame synchronizer 110 of the demodulation start point controller 100 obtains frame synchronization by searching start points of signals transmitted from the current cell and the neighbor cells, and checks whether the start points of the signals are within the cyclic prefix in step S100.

The cell searcher 120 of the demodulation start point controller 100 performs a cell search for the signals within the cyclic prefix in step S110, and calculates correlation energy of the neighbor cells from a result of the cell search and checks whether the signal strengths of the respective cells exceed a predetermined threshold value so as to check whether the mobile terminal is located on an edge of the current cell and the neighbor cell in step S120.

When the correlation energies of the respective neighbor cells do not exceed the predetermined threshold value, that is, when the mobile terminal is not located on the cell edge, the demodulation is performed only for a base station of the current cell, in step S130. In other words, when the cell searcher 120 sets a signal transmitted from the base station as a FIT start point and outputs a FFT start point control signal to start the demodulation, the FFT unit 200 converts the signal into a frequency-domain signal, generates a scramble code for the base station, and outputs the scramble code to the correlator 400.

When a correlator, for example, the correlator 400-1, located on a demodulation path to demodulate a signal transmitted from the base station of a current cell, multiples a signal output from the FFT unit 200 and a scramble code output from the scramble code generator 300 and outputs a multiplying result, and a demodulator, for example, the demodulator 500 located on the corresponding demodulation path 500-1 demodulates a signal output from the multiplier 400-1 and outputs a demodulating result. In other words, the channel estimator 510-1 of the demodulator 500 estimates a channel from a correlation signal, the equalizer 520-1 corrects distortion of the estimated channel, and the QAM demapper 530-1 demaps the corrected signal according to the QAM algorithm.

Among the signals output from the demodulator 500, a broadcast channel signal is input to the channel decoder 700 by the common channel combiner 600 and other signals are directly input to the channel decoder 700 and then restored to the original signals in step S140.

However, when the correlation energy of the neighbor exceeds the predetermined threshold value in step S120, in other words, when the mobile terminal is located on the cell edge, the demodulation is performed for a base station in which the mobile terminal is currently located and a neighbor base station in step S150. That is, when the cell searcher 120 sets the last signal transmitted from the neighbor base station as the FFT start point and outputs the FFT start point control signal to the FFT unit 200, the FFT unit 200 converts a received signal into a frequency-domain signal, and the scramble code generator 300 generates scramble codes for the base station of the current cell and a base station of the neighbor cell to be demodulated and outputs the scramble codes to the correlator 400. Herein, the number of neighbor cells to be demodulated may be more than one.

When each of the correlators 400-1 to 400-N, located on the corresponding demodulation path to demodulate a signal transmitted from a base station of a current cell, multiplies a signal output from the FFT unit 200 and a scramble code output from the scramble code generator 300 and outputs a multiplying result, the corresponding demodulation paths 500-1 to 500-N, demodulate the signals output from the correlator 400 and output a demodulating result. In other words, the channel estimators 510-1 to 510-N of the demodulator 500 estimate a channel from the correlation signal, the equalizers 520-1 to 520-N correct distortion of the channel searched signal, and the QAM demappers 530-1 to 530-N demap QAM-mapped signals and output a demapping result. That is, the number of demodulation paths is added to thereby correspond to the number of neighbor cells to be demodulated.

The signals of the common channel (e.g., broadcast channel) output from the demodulation paths 500-1 to 500-N are combined as a single type of information by the common channel combiner 600 and input to the channel decoder 700, and other signals output from the demodulation paths 500-1 to 500-N are directly input to the channel decoder 700 and restored into the original signals through the corresponding demodulation paths in step S140.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A receiving apparatus of a mobile terminal receiving a transmitted signal in a synchronous Orthogonal Frequency Division Multiplexing (OFDM) system under a multi-cell environment, the receiving apparatus comprising:
    a demodulation start controller for performing frame synchronization and cell search using a received signal and for outputting information on a demodulation start point and a neighbor cell;
    a Fast Fourier Transform (FFT) unit for respectively converting time-domain signals, transmitted from multiple cells, into frequency-domain signals;
    a scramble code generator for generating scramble codes respectively corresponding to the neighbor cell, using the information output from the demodulation start controller, and a current cell on which the mobile terminal is located;
    a correlator for multiplying the frequency-domain signals output from the FFT unit with the respective scramble codes output from the scramble code generator and for outputting respective correlated signals;
    a plurality of demodulators provided corresponding to the current cell and a maximum number of neighbor cells, each of the plurality of demodulators for demodulating the respective correlated signals output from the correlator and for outputting demodulated respective correlated signals; and
    a decoder for decoding the demodulated respective correlated signals output from the plurality of demodulators and for restoring original information transmitted from the corresponding cell.

2. The receiving apparatus of claim 1, wherein the demodulation start controller comprises:
    a frame synchronizer for searching start points of signals transmitted from the current cell on which the mobile terminal is located and the neighbor cell; and a cell searcher for obtaining information on the current cell and the neighbor cell to demodulate by searching cells from the received signal, and for outputting the information when the frame synchronizer finishes the frame synchronization.

3. The receiving apparatus of claim 1, wherein the correlator comprises a plurality of multiplying units provided corresponding to the current cell and the maximum number of the neighbor cells, each of the plurality of multiplying units for multiplying the frequency-domain signals output from the FFT unit and the scramble codes output from the scramble code generator, and for outputting a multiplied result.

4. The receiving apparatus of claim 1, wherein each of the demodulators comprises:
    a channel estimator for performing channel estimation using the respective correlated signal output from the correlator;
    an equalizer for correcting a distorted signal during transmission from a channel estimated signal output from the channel estimator; and
    a demapper for demapping a Quadrature Amplitude Modulation (QAM)-mapped signal output from the equalizer, and for outputting a demapped result.

5. The receiving apparatus of claim 1, wherein the decoder comprises:
    a common channel combiner for receiving signals corresponding to a common channel from among the demodulated respective correlated signals output from the demodulators, for combining the received signals to be a single type of information, and for outputting the information; and
    a channel decoder for decoding the demodulated respective correlated signals output from the demodulators and information output from the common channel combiner into original signals from cells, respectively, and for outputting the original signals.

6. The receiving apparatus of one of claim 1 to claim 5, wherein the demodulation start point is set to a position of a last signal of signals transmitted from the neighbor cell.

7. The receiving apparatus of claim 6, wherein the start points of signals transmitted from the current cell and the neighbor cell are set within a cyclic prefix.

8. The receiving apparatus of claim 6, wherein the neighbor cell is determined when the mobile terminal is located on an edge of the current cell and the neighbor cell.

9. The receiving apparatus of claim 8, wherein the mobile terminal is located on the current cell and the neighbor cell when intensity of a signal transmitted from the neighbor cell exceeds a predetermined threshold value.

10. A method of a mobile terminal for receiving a transmitted signal in a synchronized Orthogonal Frequency Division Multiplexing (OFDM) system under a multi-cell environment, the method comprising:
    obtaining frame synchronization of signals transmitted from multiple cells, and determining whether start points of each frame synchronized signal are respectively included within a predetermined range;
    performing cell search on the frame synchronized signals when the start points of the frame synchronized signals are included within the predetermined range;
    determining whether to demodulate a neighbor cell of a current cell on which the mobile terminal is located after performing the cell search; and
    setting a demodulation start point at a last signal transmitted from the neighbor cell and performing demodulation on the current cell and the neighbor cell if it is determined to demodulate the neighbor cell.

11. The method of claim 10, wherein demodulation is performed on the current cell if it is determined not to demodulate the neighbor cell.

12. The method of claim 10, or claim 11, wherein the predetermined range is set as a cyclic prefix.

13. The method of claim 12, wherein, the determining of whether to demodulate the neighbor cell of the current cell is determined by determining whether the mobile terminal is located on an edge of the current cell and the neighbor cell.

14. The method of claim 13, wherein the determining of whether the mobile terminal is located on the edge is determined by whether intensity of a neighbor cell exceeds a predetermined threshold value, the intensity of the neighbor cell being determined from a result of the cell search.

15. The method of claim 12, wherein the setting of the demodulation start point and the performing of the demodulation comprises:
    performing Fast Fourier Transform (FFT) on the last signal transmitted from the neighbor cell;
    performing correlation on an FFT-ed signal using a scramble code for the current cell and a scramble code for the neighbor cell;
    performing demodulation on a correlated FFT-ed signal; and
    restoring original signals of the current cell and the neighbor cell by respectively decoding demodulated signals of the current cell and the neighbor cell.

16. The method of claim 15, wherein the performing of the demodulation on the correlated FFT-ed signal comprises:
    estimating a channel using the correlated FFT-ed
    correcting distortion of the channel estimated signal; and
    demapping the distortion corrected signal according to a Quadrature Amplitude Modulation (QAM) algorithm.

17. The method of claim 15, wherein the restoring of the original signal comprises:
    combining common channel signals among demodulated correlated FFT-ed signals into a single type of information; and
    decoding original signals of the current cell and the neighbor cell using the combined common channel signals and the demodulated correlated FFT-ed signals excluding the common channel signals.

* * * * *